(12) United States Patent
Hulin

(10) Patent No.: US 6,372,275 B1
(45) Date of Patent: Apr. 16, 2002

(54) DRYING APPARATUS FOR BOILED SEAFOOD

(76) Inventor: Michael J Hulin, 2166 Hwy. 319, Franklin, LA (US) 70538

(*) Notice: Subject to any disclaimer, the term of this patent is extended or adjusted under 35 U.S.C. 154(b) by 0 days.

(21) Appl. No.: 09/506,651

(22) Filed: Feb. 17, 2000

(51) Int. Cl.$^7$ ................ A23L 1/33
(52) U.S. Cl. .............. 426/479; 426/472; 426/643
(58) Field of Search .............. 426/479, 472, 426/643

(56) References Cited

U.S. PATENT DOCUMENTS

| | | | |
|---|---|---|---|
| 3,740,795 A | | 6/1973 | Cox |
| 4,281,436 A | * | 8/1981 | Hoffman et al. |
| 5,046,411 A | * | 9/1991 | le Grand et al. |
| 5,518,444 A | * | 5/1996 | Hulin |
| 5,531,156 A | | 7/1996 | Brummett |
| 5,545,422 A | | 8/1996 | Davies et al. |
| 5,570,516 A | | 11/1996 | Huang |

FOREIGN PATENT DOCUMENTS

| | | | |
|---|---|---|---|
| DE | 3535681 | * | 4/1987 |
| JP | 59-102370 | * | 6/1984 |

* cited by examiner

Primary Examiner—Anthony Weier
(74) Attorney, Agent, or Firm—Michael I. Kroll (57) ABSTRACT

The present invention 10 involves a drying process wherein cooked seafood 12 is deposited into an input port 14 of the dryer 10 wherein a conveyance system 16 moves the seafood or shellfish 12 while it is being dried. A power supply 28 is provided for the conveyance system 16 along with an on/off switch 30. Dryer equipment is provided by a blower 32 having a heater 34 thereby providing a piped hot air system 36. At a selected predetermined time the shellfish 12 are removed manually 18 or by vacuum equipment 20 to a peeling device 22 having rotational equipment for turning the shellfish 12 until the shells 24 have been removed by vacuum equipment 20 to a predetermined location as well as the cleaned product 26 being removed to a predetermined location. Alternative designs are provided using an ascending conveyance system and a stacked horizontal conveyance system. Also, alternative peeler designs are provided.

14 Claims, 10 Drawing Sheets

| SELECT SHRIMP FOR DRYING |
|---|

| INSERT SHRIMP INTO DRYER |

| SPREAD SHRIMP OVER CONVEYOR SURFACE |

| TURN ON DRYER |

| HEATER BLOWS HOT AIR INTO UNIT |

| CONVEYOR MOVES SHRIMP THROUGH DRYER |

| BLOWERS MOVE HOT AIR OVER SHRIMP |

| SHRIMP REACH APEX OF CONVEYOR SYSTEM AND DROPPED INTO SCREENED CHUTE |

```
┌─────────────────────────────────────────┐
│       SELECT SHRIMP FOR DRYING          │
└─────────────────────────────────────────┘
                    │
┌─────────────────────────────────────────┐
│        INSERT SHRIMP INTO DRYER         │
└─────────────────────────────────────────┘
                    │
┌─────────────────────────────────────────┐
│   SPREAD SHRIMP OVER CONVEYOR SURFACE   │
└─────────────────────────────────────────┘
                    │
┌─────────────────────────────────────────┐
│              TURN ON DRYER              │
└─────────────────────────────────────────┘
                    │
┌─────────────────────────────────────────┐
│      HEATER BLOWS HOT AIR INTO UNIT     │
└─────────────────────────────────────────┘
                    │
┌─────────────────────────────────────────┐
│    CONVEYOR MOVES SHRIMP THROUGH DRYER  │
└─────────────────────────────────────────┘
                    │
┌─────────────────────────────────────────┐
│      BLOWERS MOVE HOT AIR OVER SHRIMP   │
└─────────────────────────────────────────┘
                    │
┌─────────────────────────────────────────┐
│ SHRIMP REACH END OF CONVEYOR BELT AND   │
│ DROP TO NEXT CONVEYANCE LEVEL           │
└─────────────────────────────────────────┘
```

DRYING APPARATUS FOR BOILED SEAFOOD

BACKGROUND OF THE INVENTION

1. Field of the Invention

The present invention relates generally to drying boiled seafood and, more specifically, to an apparatus wherein boiled seafood product, such as shrimp and crayfish, will be deposited through an intake port onto a conveyance whereupon said seafood product will be evenly distributed by mechanical means. While traveling along a conveyor belt made from a mesh-like material the product will be dried by a forced air heating system having one or more blowers to direct the heated air in the most advantageous pattern based on the size and shape of the apparatus until arriving at the apex of the conveyor system which may have means for funneling the seafood product into a smaller area. The seafood product will then be subjected by a vacuum member to an amount of vacuum, which can vary over the complete drying cycle time span, that will transport some of the seafood product based on weight which is relative to size, for further processing to the peeling device, and wherein the remainder of the seafood product will be dropped through a chute where it will be deposited again on the conveyor belt on a lower point. This process will continue until the drying cycle time is complete and all of the seafood product has been vacuumed into the peeling device. It should be noted that the introduction of vacuum to the seafood product by the vacuum member can occur in one or more places between the apex of the conveyor system and the free fall return of the product to a lower point on the conveying system. Furthermore, an alternate embodiment is provided wherein the boiled seafood product is introduced into the top of an apparatus, again having means for providing heated forced air into the apparatus by one or more blowers and time variable vacuum means for sorting the seafood product and wherein said apparatus having a number of horizontally stacked conveyor members. Each lower conveyor member extends beyond the end of the upper conveyor member for the purpose of supplying a platform for receiving the seafood product as it drops off of the upper conveyor as it travels from the highest horizontal conveyor member to the lowest horizontal conveyor member where it will be collected by an unspecified mechanical or manual means and returned to the introduction port of the apparatus at the point of the highest conveyor member.

An additional alternate embodiment is provided wherein the boiled seafood product is introduced into the driving apparatus and having been dried by is removed and transported by vacuum means to an apparatus for shelling dried shrimp. The apparatus comprising an outer container and an inner container wherein said vacuum means deposits the seafood into the inner container where the seafood is turned by a rotating blade which loosens the shells from the seafood. The shells are drawn by vacuum means into collecting containers for appropriate disposal. This procedure forms an integral part of a completely automated system for removing the shells from a seafood product. Furthermore dried product can also be transported to tumble type peelers that are being used at the present time. Product can be loaded by size or the dryers can be unloaded partially or totally wet.

2. Description of the Prior Art

There are other conveyor type driers. Typical of these is U.S. Pat. No. 2,688,807 issued to Ginther on Sep. 14, 1954. Yet another U.S. Pat. No. 998,236 was issued to DeToy and Shepard on Jul. 18, 1911 and still yet another was issued on Jan. 11, 1983 to Onodera as U.S. Pat. No. 4,367,596. Another patent was issued to Moscow Meat Dairy Inst. on Jan. 25, 1978 as Patent No. 591669. Yet another German Patent No. 387439 was issued to Raeber on Dec. 28, 1923 and still yet another was issued on Feb. 17, 1976 to Alfred et al. as U.S. Pat. No. 3,938,651.

Another patent was issued to Confectionery Ind. on Aug. 6, 1979 as U.S. Pat. No. 676,836. Yet another U.S. Pat. No. 1,017,723 was issued to Woodbridge on Feb. 20, 1912 still yet another was issued on Sep. 4, 1883 to Towle as U.S. Pat. No. 284,579.

U.S. Pat. No. 2,688,807

Inventor: James H. Ginther

Issued: Sep. 14, 1954

This United States Patent discloses a device for simultaneously drying and conveying including a vertical helical vibrating conveyor, a vertical helical baffle coaxial and of equal pitch with said conveyor, the outer edge of said conveyor abutting the inner edge of said baffle, and means for supplying heated air to said dryer and conveying apparatus.

Furthermore having means for enclosing said conveyor and baffle, an inlet substantially adjacent the bottom of said conveyor for delivering material to be dried and an outlet substantially adjacent the top of said conveyor for discharging the dried material and means for directing said heated air counter-current to the flow of said material being dried.

U.S. Pat. No. 998,236

Inventor: Louis DeToy et al.

Issued: Jul. 18, 1911

This United States Patent discloses an apparatus for steaming, drying and cooling having a continuous spirally arranged exposing surface arranged about a vertical axis and means for directly depositing the material over the entire surface.

In addition said apparatus having a casing, a drum therein rotatable on a vertical axis, means for depositing material on the exposing surface, means in advance of the depositing means for removing the previously deposited material and means for maintaining a given condition of atmosphere within the casing.

Furthermore said apparatus having a feed table for depositing material on the surface and means for moving the feed-table in time with the progression of the spiral and means for directing current of air across the exposing surface.

U.S. Pat. No. 4,367,596

Inventor: Hirohumi Onodera

Issued: Jan. 11, 1983

A drying apparatus includes a rotary drum having a vertical axis and adapted for one-way revolution. A conveyor is spirally wound round the rotary drum and driven thereby. A casing covers the conveyor, with a chamber provided between the inner surface of the casing and the outer side of the conveyor, and the casing surrounding the whole or a part of the circumference of the conveyor. Hot blast is supplied to the chamber. Blast pipes connected to the chamber blow the hot blast upon the upper and lower surfaces of the conveyor.

Soviet Union Patent Number 591.669

Inventor: Moscow Meat Dairy Institute

Issued: Jan. 25, 1978

This patent discloses a drier comprising a vertical cylindrical chamber with a mechanism for transporting griddles with material along a spiral trajectory and heating elements inside the chamber. The transporting mechanism is in the form of two co-axial guides connected by radial spokes and a guide mechanism along the axis of the chamber. The griddles are sector-shaped with a recess for the guide on the inner cylindrical surface.

German Republic Patent Number 387,439

Inventor: Dr. Arnold Raeber

Issued: Dec. 28, 1923

This patent discloses a vertical cylindrical apparatus having a vertical cylindrical chamber therein having a spiral conveyance with an intake feedway positioned at the bottom of said apparatus for depositing material onto said conveyor whereby said material is conveyed to the apex of said conveyor wherein it is deposited onto a spiral shaped chute having egress means substantially adjacent said intake feedway.

U.S. Pat. No 3,938,651

Inventor: P. Allan Alfred et al.

Issued: Feb. 17, 1976

In a conveying device with an endless conveyor belt, for the conveyance of products, the conveyor belt is adapted, over a part of its length, to follow a path comprising a number of superimposed, helically extending belt tiers. To this end, the conveyor belt comprises mutually articulated and interadjustable link means consisting of a bottom part and links disposed at the ends thereof and forming the two sides of the belt. The links on the two sides of the endless conveyor belt are formed as spacers whose upper edge portions are adapted to bear against the lower edge portions of the links, likewise formed as spacers, disposed on the two sides of the overlying tier of the endless conveyor belt in order that such an overlying belt tier be supported by the immediately underlying tier of the conveyor belt.

Soviet Union Patent Number 676,836

Inventor: Confectionery Industry

Issued: Aug. 8, 1979

This patent discloses a vibration dryer having row of sloping plates fitted in loading pipe for free flowing material. The apparatus further having a thermally-insulated housing with loading pipe and feed trough. A vertical cylindrical gas distribution manifold is fitted in the housing. A spiral chute conveyor is fitted on the vertical manifold. The conveyor is connected to the feed trough and a row of sloping plates are fitted in the loading pipe. The sloping plates lower edges are parallel to the trough. The distance between the plates lower edge to the trough is not less than the transporting material layer height. Thus the heat carrier consumption is reduced by 30–50%.

U.S. Pat. No. 1,017,723

Inventor: Samuel M. Woodbridge

Issued: Feb. 20, 1912

This United States patent discloses a precooling apparatus, comprising a cylindrical chamber having a central post, a spiral chute arranged in the annular space between said post, and the chamber wall, the inclination of said spiral being slight to enable the fruit to pass through the apparatus in a single layer, a discharge hopper at the lower end of the spiral chute adapted to prevent the spiral chute from discharging itself, and means for forcing a cooling air current along the chute as the fruit descends.

U.S. Pat. No. 284,579

Inventor: John J. Towle

Issued: Sep. 4, 1883

This United States patent discloses a fruit evaporator, the combination, with the cylindrical case, of the central cylindrical drum, between which and the case is arranged a spiral partition, extending continuously from the bottom to the top thereof, and from the side opening, to the top opening, closed by the door, furnace, and means for conducting the products of combustion to the central drum, substantially as and for the purpose set forth.

In addition a plurality of trays, constructed and arranged to traverse a spiral drying-flue, and having dowel and dowel holes for self guides and a lever with a drying case having a spiral drying flue.

While these driers may be suitable for the purposes for which they were designed, they would not be as suitable for the purposes of the present invention, as hereinafter described.

SUMMARY OF THE PRESENT INVENTION

The present invention discloses a drying process wherein cooked seafood is deposited into an input port of the dryer wherein a conveyance system moves the seafood or shellfish while it is being dried. A power supply is provided for the conveyance system along with an on/off switch. Dryer means is provided by a blower having a heater thereby providing a piped hot air system. At a selected predetermined time the shellfish are removed manually or by vacuum means to a peeling device having rotational means for turning the shellfish until the shells have been removed by vacuum means to a predetermined location as well as the cleaned product being removed to a predetermined location. Alternative designs are provided using an ascending conveyance system and a stacked horizontal conveyance system. Also, alternative peeler designs are provided.

A primary object of the present invention is to provide an apparatus for drying boiled shellfish such as shrimp and crayfish.

Another object of the present invention is to provide an apparatus having a heated forced air circulation member with one or more blowers to direct an airflow throughout the apparatus.

Yet another object of the present invention is to provide an apparatus for periodically rotating the shellfish as they are being dried.

Still yet another object of the present invention is to provide an exact amount of drying time based on the size of the shellfish.

Another object of the present invention is to provide means for removing the shellfish based on size using vacuum or a combination of injected air and vacuum.

Yet another object of the present invention is to provide means for unloading the product from the dryer through the intake inlet by reversing the conveyor system.

Still yet another object of the present invention is to provide means for unloading the product from the dryer and transporting product to the peeling device by placing a vacuum attachment at the bottom of the chute, which will feed through the peeling device and then to the vacuum system holding tank. This tank will hold the shells and dust of the product eliminating clean-up of shells and small particulate matter resembling dust.

A still further object of the present invention is to provide a drying apparatus for boiled seafood having condensation vents and a heat supply placed at different positions within the dryer to expel condensation from the dryer. Heat will be recirculated and it will be supplied from two sources. Commercial heaters will be one source and the other source will be from the boiler system. Piped air will go through the shrimp boiler system and will be blown into the drying system. This will make the heating very economical and efficient.

Another object of the present invention is to provide a sanitary means for drying boiled shellfish.

Yet another object of the present invention is to provide a fully automated system for drying, removal of the shells, and the separation and storage of the shells from the dried boiled shellfish.

Still yet another object of the present invention is to increase the grade and quality of the finished boiled dried shellfish product by automating the drying process based on known factors such as size and weight and removing the boiled shellfish to an apparatus which will loosen and remove the shells to collection containers without damaging the shellfish.

Additional objects of the present invention will appear as the description proceeds.

The present invention overcomes the shortcomings of the prior art by providing a sanitary means for drying boiled seafood by providing an apparatus wherein boiled seafood product is introduced into the apparatus and travels along a conveyance being either an ascending circular conveyor belt or a number of stacked horizontal conveyor belts and wherein said conveyor belt will be constructed from a webbed or screen-like material whereby said seafood product will be thoroughly subjected to a volume of heated forced air by one or more blowers and said product will be randomly rotated by said ascending circular conveyance as it free falls from the apex to a lower point of said ascending circular means or said product will be repetitiously rotated while free falling from one level to the next in the stacked horizontal conveyor belt apparatus and further said product will be dried to its optimum point by removal of said product by one or more vacuum members or a combination of injected air and vacuum member or members stationed along said conveyance which will automatically unload product as well as load peeler and deposit residual shells and dust into drums or storage containers. Making the whole operation a lot more efficient.

In addition an alternate embodiment is provided wherein the boiled seafood product is introduced into the drying apparatus and having been dried by is removed and transported by vacuum means to an apparatus for shelling dried shrimp. Said apparatus comprising an outer container and an inner container wherein said vacuum means deposits the seafood into the inner container where the seafood is turned by a rotating blade which loosens the shells from the seafood. The shells are drawn by vacuum means into collecting containers for appropriate disposal. This procedure forms an integral part of a completely automated system for removing the shells from a seafood product.

Product can be transported by vacuum means to a conventional peeler (screen) tumbler. With this system an operator could load the dried product by size or load it all at once.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to the reference numerals used, the following numbering is used throughout the drawings.

10 present invention
12 seafood
14 input port
16 conveyance system
18 manual outlet
20 vacuum
22 peeling device
24 shells
26 cleaned product
28 power supply
30 on/off switch
32 blower
34 heater
36 piped hot air system
38 vacuum hose
40 peeler
42 vacuum hose
44 tumbler
46 boiling system
48 hot air
50 dryer
52 vacuum system
54 dumping spout

DESCRIPTION OF THE PREFERRED EMBODIMENT(S)

Turning now descriptively to the drawings, in which similar reference characters denote similar elements throughout the several views, FIGS. 1 through 5A illustrate the present invention being an apparatus for drying boiled seafood.

Figure 1:
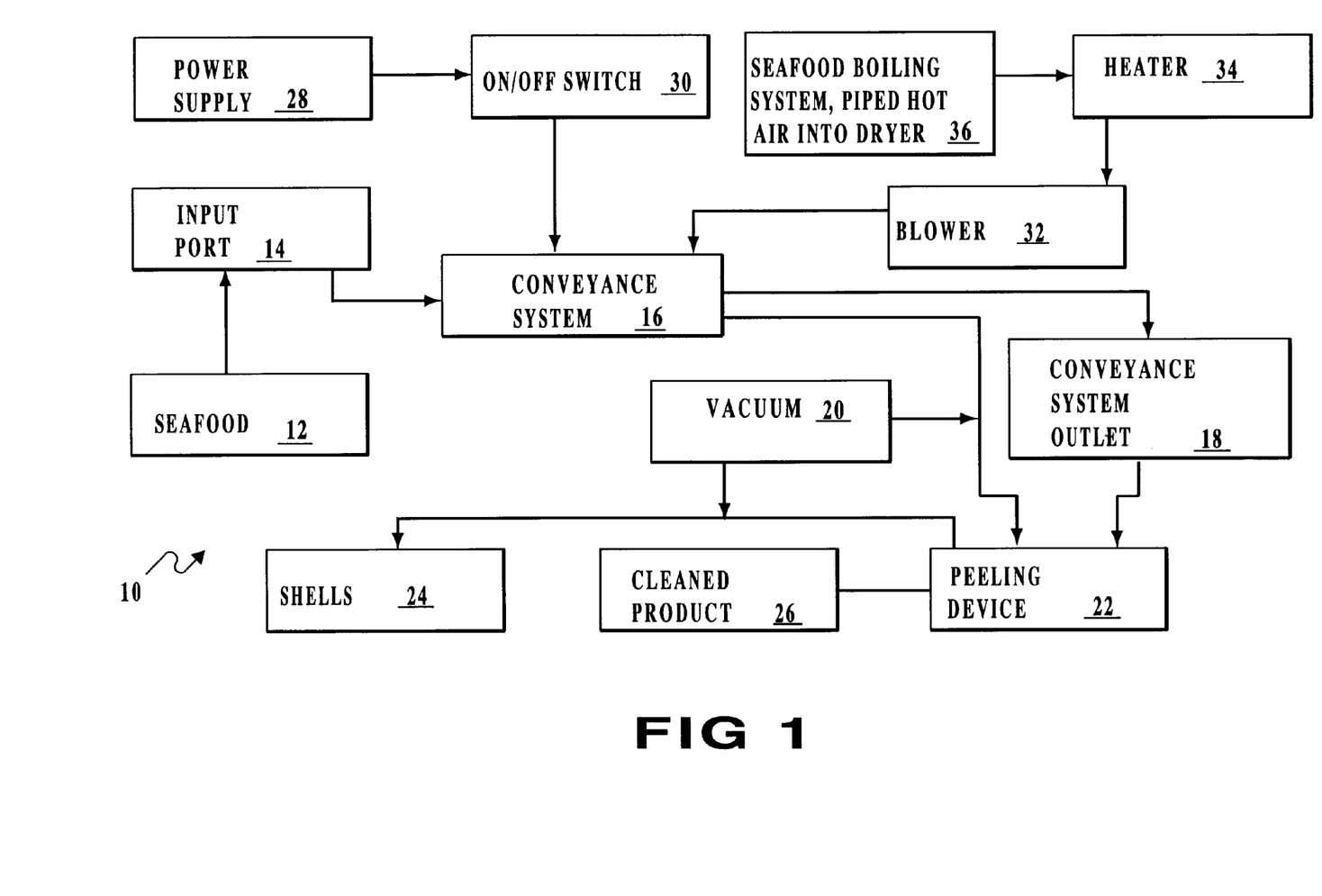
FIG. 1 is a diagrammatic view of the drying process using one embodiment of the present invention wherein the seafood is deposited into an input port of the dryer wherein a conveyance system moves the shellfish while it is being dried. At a selected predetermined time the shellfish is removed manually or by vacuum means to a peeling device having rotational means for turning the shellfish until the shells have been removed by vacuum means to a predetermined location.

Turning to FIG. 1, therein is shown a diagrammatic view of the drying process using one embodiment of the present invention 10 wherein the cooked and therefore moisture laden seafood 12 is deposited into an input port 14 of the dryer of the present invention 10 wherein a conveyance system 16 moves the seafood or shellfish 12 while it is being dried. A power supply 28 is provided for the conveyance system 16 along with an on/off switch 30. Dryer means is provided by a piped hot air system 36 having a blower 32 and a heater 34. At a selected predetermined time the shellfish 12 are removed manually through an outlet 18 or by vacuum means 20 to a peeling device 22 having rotational means (not shown) for turning the shellfish 12 until the shells 24 have been removed by vacuum means 20 to a predetermined location as well as the cleaned product 26 being removed to a predetermined location.

Figure 2:
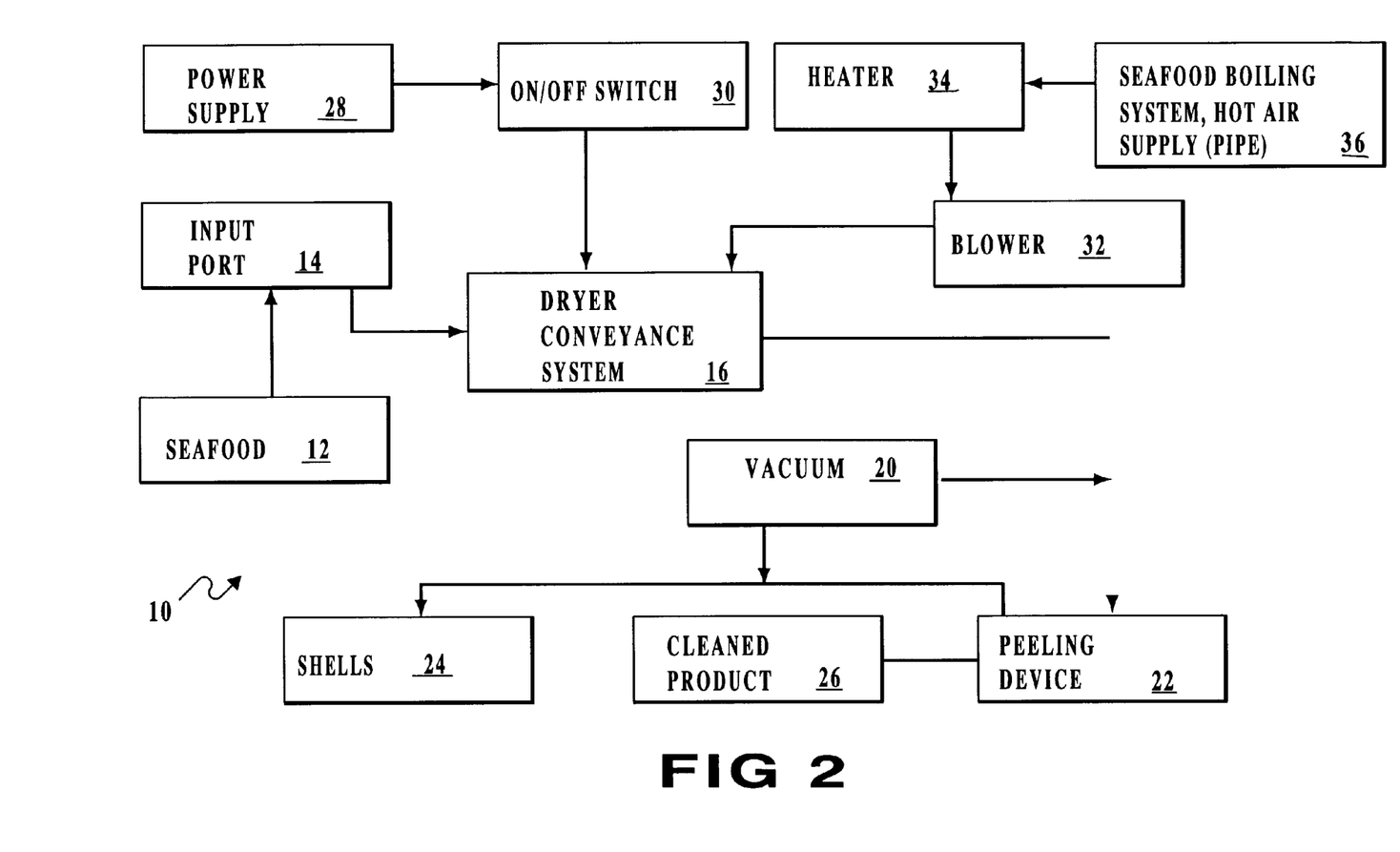
FIG. 2 is a diagrammatic view of the drying process using one embodiment of the present invention wherein the seafood is deposited into an input port of the dryer wherein a conveyance system moves the product while it is being dried. At a selected predetermined point some or all of the product is removed by vacuum means and is transported to an apparatus having rotational means for turning the shellfish until the shells have been removed by vacuum means to a predetermined location.

Turning to FIG. 2, therein is shown a diagrammatic view of the drying process using one embodiment of the present invention 10 wherein the cooked seafood 12 is deposited into an input port 14 of the dryer of the present invention 10 wherein a conveyance system 16 moves the seafood or shellfish 12 while it is being dried. A power supply 28 is provided for the conveyance system 16 along with an on/off switch 30. Dryer means is provided by a piped hot air system 36 having a blower 32 and a heater 34. At a selected predetermined time and point some or all of the shellfish 12 is removed by vacuum means 20 to a peeling device 22 having rotational means (not shown) for turning the shellfish 12 until the shells 24 have been removed by vacuum means 20 to a predetermined location as well as the cleaned product 26 being removed to a predetermined location.

Figure 3:
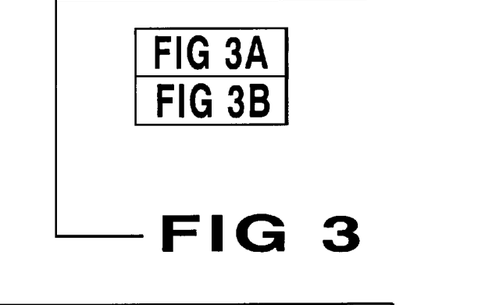
FIG. 3 is a block diagram of the steps in the ascending conveyance system drying process.
Figure 3A:
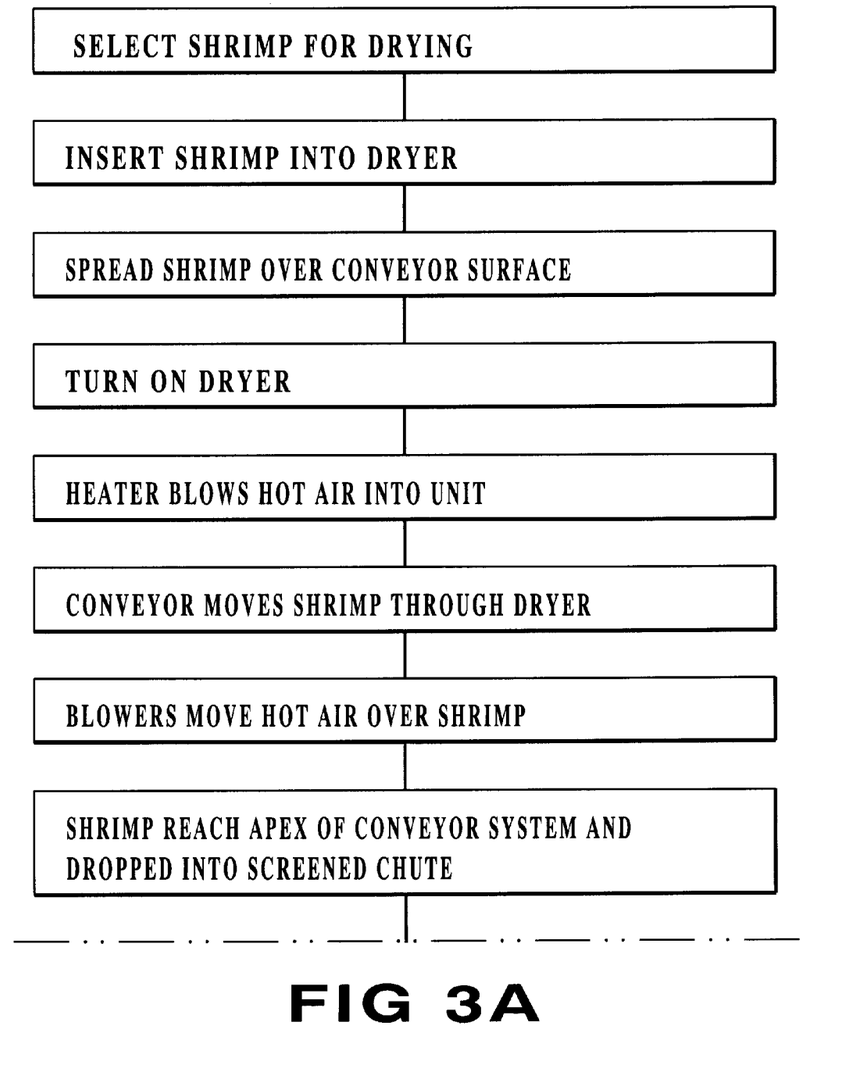
Figure 3B:
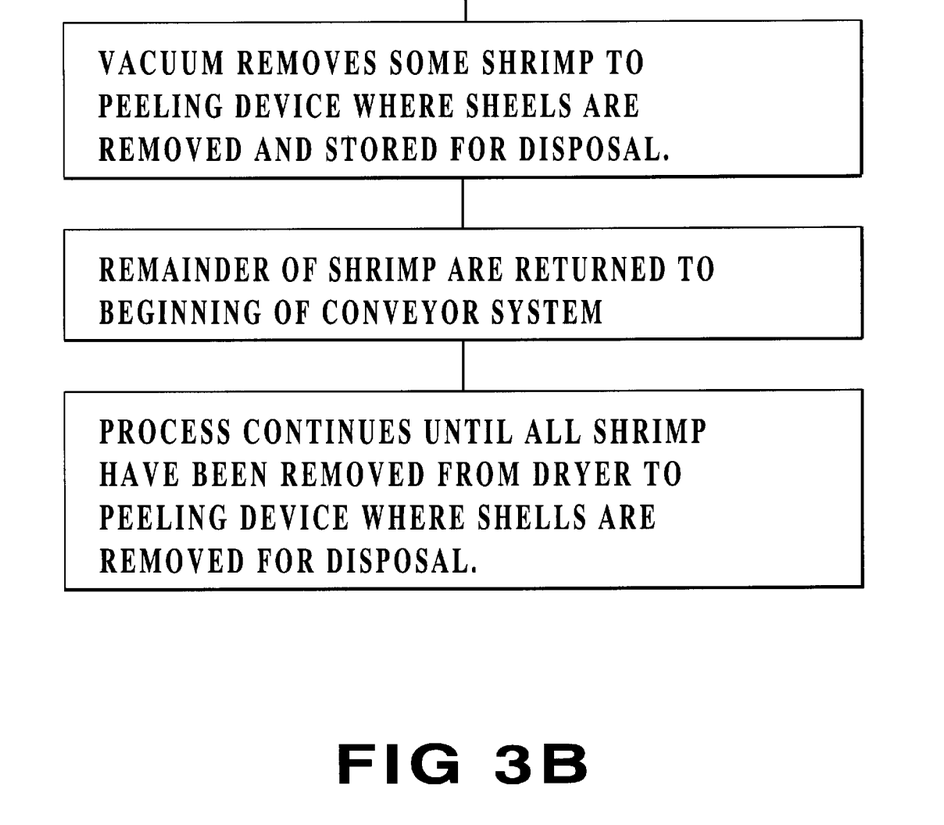

Turning to FIG. 3, 3A and 3B, therein is shown a block diagram of the steps in the ascending conveyance system drying process. The steps are as follows: 1) select shrimp for drying, 2) insert shrimp into dryer, 3) spread shrimp over conveyor surface, 4) turn on dryer, 5) heater blows how air into unit, 6) conveyor moves shrimp through dryer, 7) blowers move hot air over shrimp, 8) shrimp reach apex of conveyor system and drop into screened chute, 9) vacuum removes some shrimp to peeling device where shells are removed and stored for disposal, 10) remainder of shrimp are returned to beginning of conveyor system, and, 11) process continues until all shrimp have been removed from dryer to peeling device where shells are removed for disposal. Boiled seafood product, such as shrimp and crayfish, will be deposited through an intake port 14 onto a conveyance 16 whereupon the seafood 12 product will be evenly distributed by mechanical means. While traveling along a conveyor belt 16 made from a mesh-like material the product will be dried by a forced air heating system having one or more blowers 32 to direct the heated air in the most advantageous pattern based on the size and shape of the apparatus until arriving at the apex of the conveyor system 16 which may have means for funneling the seafood product into a smaller area. The seafood product will then be subjected by a vacuum member 20 to an amount of vacuum, which can vary over the complete drying cycle time span, that will transport some of the seafood product 12 based on weight which is relative to size, for further processing to the peeling device 22, and wherein the remainder of the seafood product 12 will be dropped through a chute where it will be deposited again on the conveyor belt 16 on a lower point. This process will continue until the drying cycle time is complete and all of the seafood product has been vacuumed into the peeling device 22. It should be noted that the introduction of vacuum to the seafood product by the vacuum member can occur in one or more places between the apex of the conveyor system and the free fall return of the product to a lower point on the conveying system.

Figure 4:
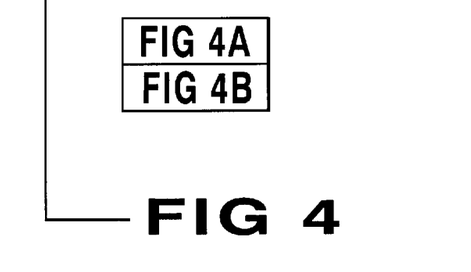
FIG. 4 is a block diagram of the steps in the stacked horizontal conveyance system drying process.
Figure 4A:
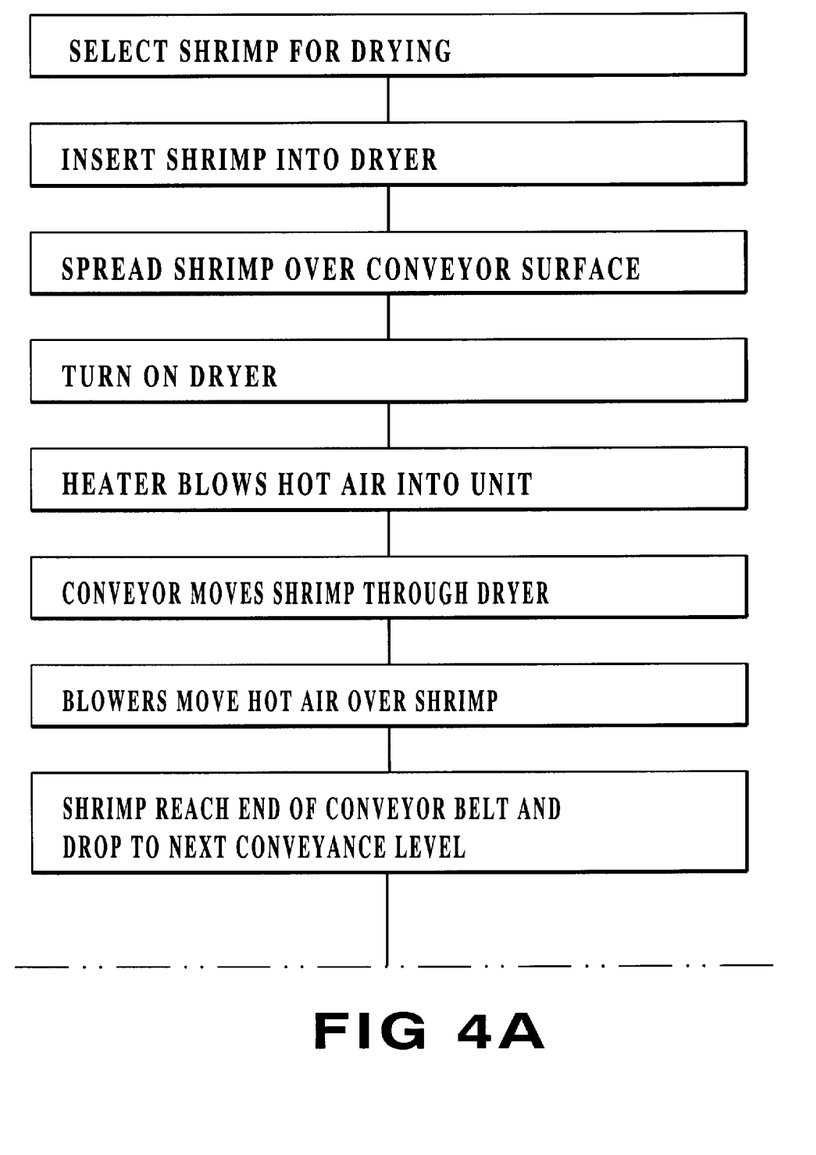
Figure 4B:
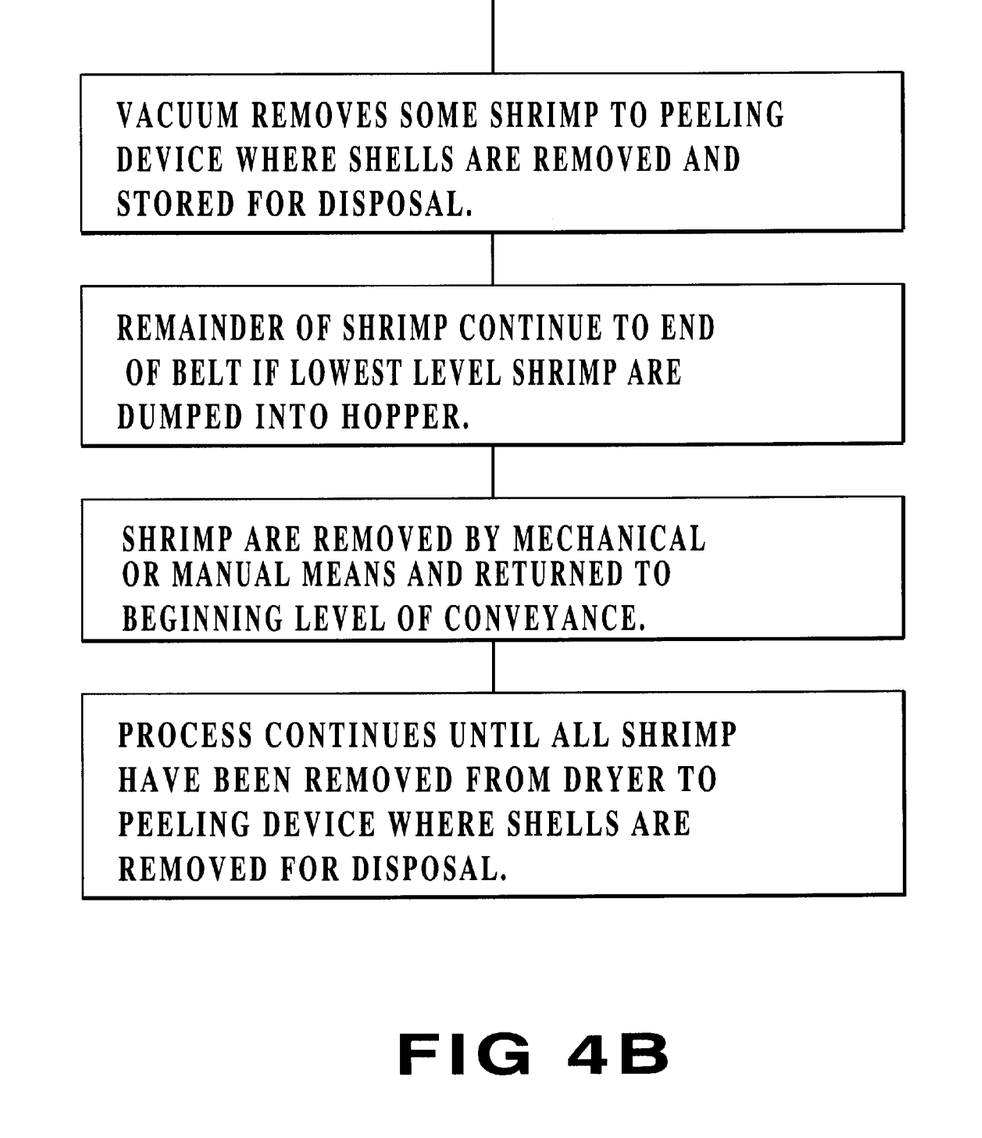

Turning to FIGS. 4, 4A and 4B, therein is shown a block diagram of the steps in the stacked horizontal conveyance system drying process. The steps are as follows: 1) select shrimp for drying, 2) insert shrimp into dryer, 3) spread shrimp over conveyor surface, 4) turn on dryer, 5) heater blows hot air into unit, 6) conveyor moves shrimp through dryer, 7) blowers move hot air over shrimp, 8) shrimp reach end of conveyor belt and drop to next conveyance level, 9) vacuum removes some shrimp to peeling device where shells are removed and stored for disposal, 10) remainder of shrimp continue to end of belt if lowest level shrimp are dumped into hopper, 11) shrimp are removed by mechanical or manual means and returned to beginning level of conveyance, and, 12) process continues until all shrimp have been removed from dryer to peeling device where shells are removed for disposal. An alternate embodiment is provided wherein the boiled seafood product 12 is introduced into the top of an apparatus, again having means for providing heated forced air into the apparatus by one or more blowers 32 and time variable vacuum means 20 for sorting the seafood product and wherein the apparatus has a number of horizontally stacked conveyor members 16. Each lower conveyor member 16 extends beyond the end of the upper conveyor member for the purpose of supplying a platform for receiving the seafood product as it drops off of the upper conveyor 16 as it travels from the highest horizontal conveyor member to the lowest horizontal conveyor member where it will be collected by an unspecified mechanical or manual means and returned to the introduction port of the apparatus at the point of the highest conveyor member.

Figure 5:
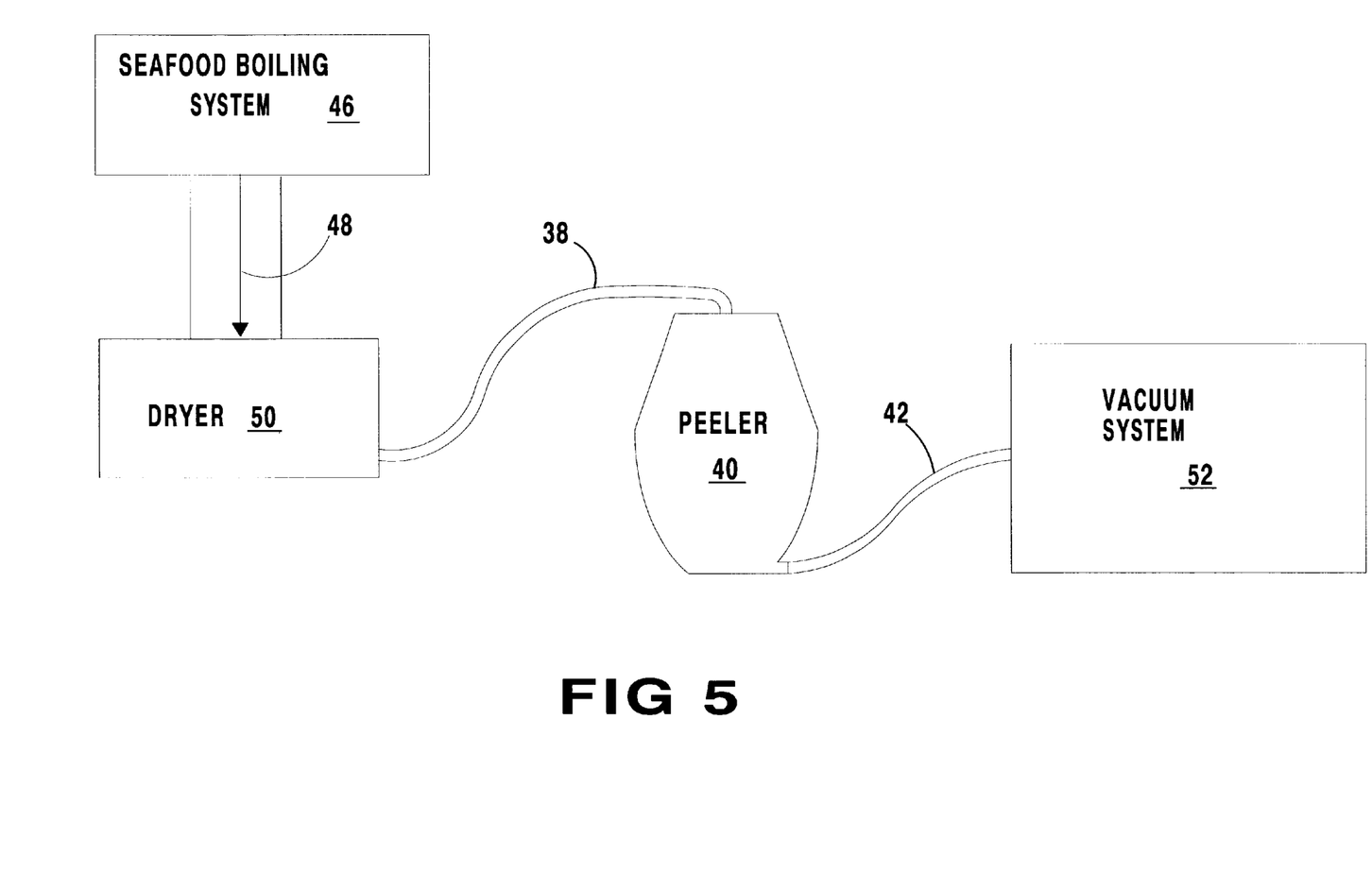
FIG. 5 is an illustration of the drying apparatus having vacuum means for removing the boiled shellfish from the dryer to a peeling device wherein the shells will be removed by vacuum means to an appropriate location leaving the cleaned dried shellfish within the peeler.

Turning to FIG. 5, therein is shown an illustration showing the boiling system 46 along with hot air means 48 of the drying apparatus having vacuum means 38 for removing the boiled shellfish from the dryer 50 to a peeling device 40 wherein the shells will be removed by a vacuum means 42 to an appropriate location of the vacuum system 52 leaving the cleaned dried shellfish within the peeler 40. This embodiment is provided wherein the boiled seafood product is introduced into the drying apparatus and having been dried thereby is removed and transported by vacuum means 38 to an apparatus 40 for shelling dried shrimp. The apparatus 40 comprises an outer container and an inner container wherein the vacuum means deposits the seafood into the inner container where the seafood is turned by a rotating blade which loosens the shells from the seafood. The shells are drawn by vacuum means 42 into collecting containers for appropriate disposal. This procedure forms an integral part of a completely automated system for removing the shells from a seafood product.

Figure 5A:
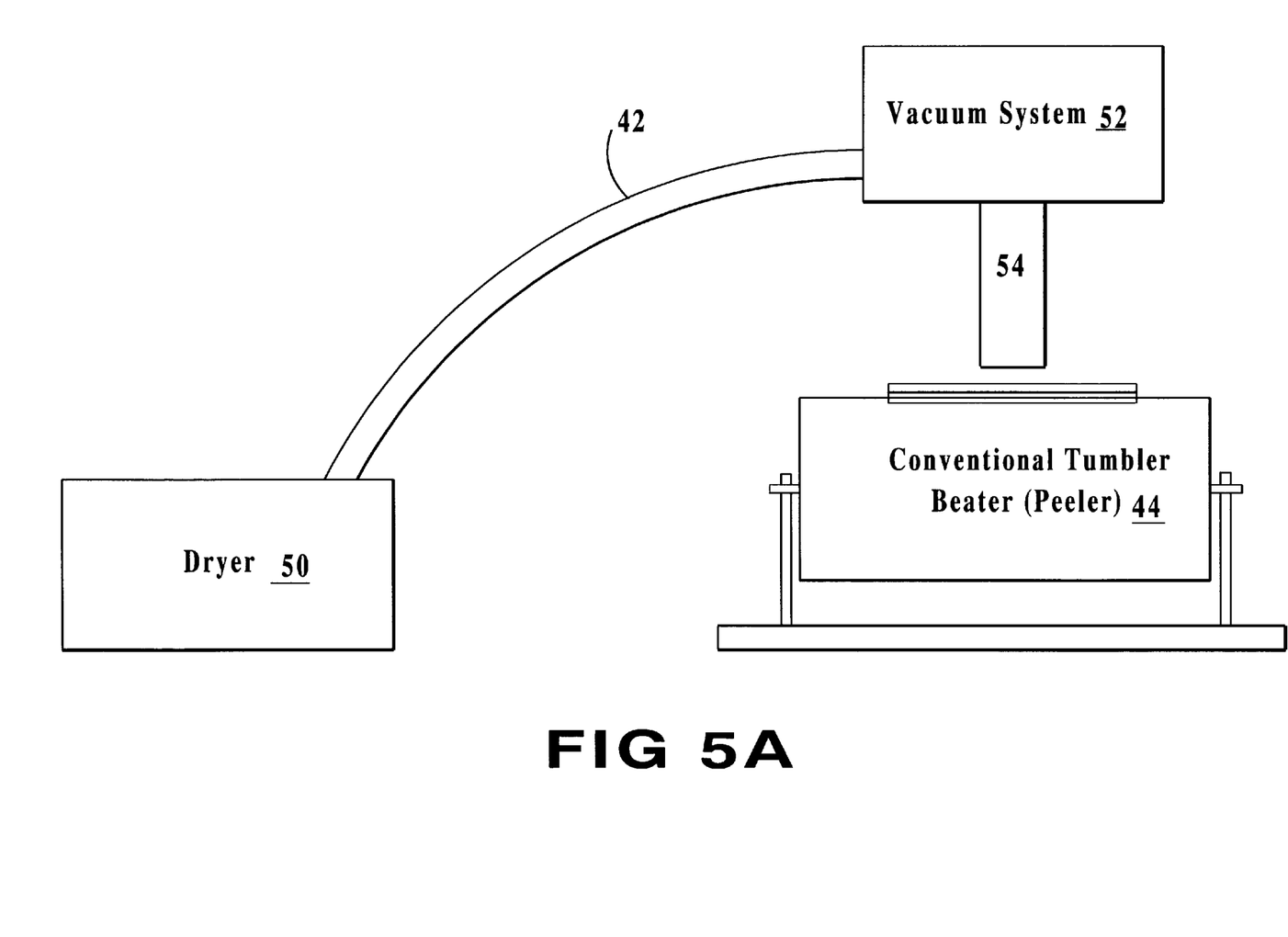
FIG. 5A is an illustration of the drying system currently being used, which is a screen tumbler system. They currently load this peeler manually. The present invention could be used on this conventional system as follows. The loading of product can either load the product by size or load the complete content all at once.

Turning to FIG. 5A, therein is shown an illustration of the drying system currently being used, which is a screen tumbler system 44. Shown is a dryer 50, vacuum hose 38 and vacuum system 52. Users currently load this type peeler 44 manually through a dumping spout 54. The present invention could be used on this conventional system wherein the loading of product can either be based on size or the user can load the complete contents all at once.

Figure 6:
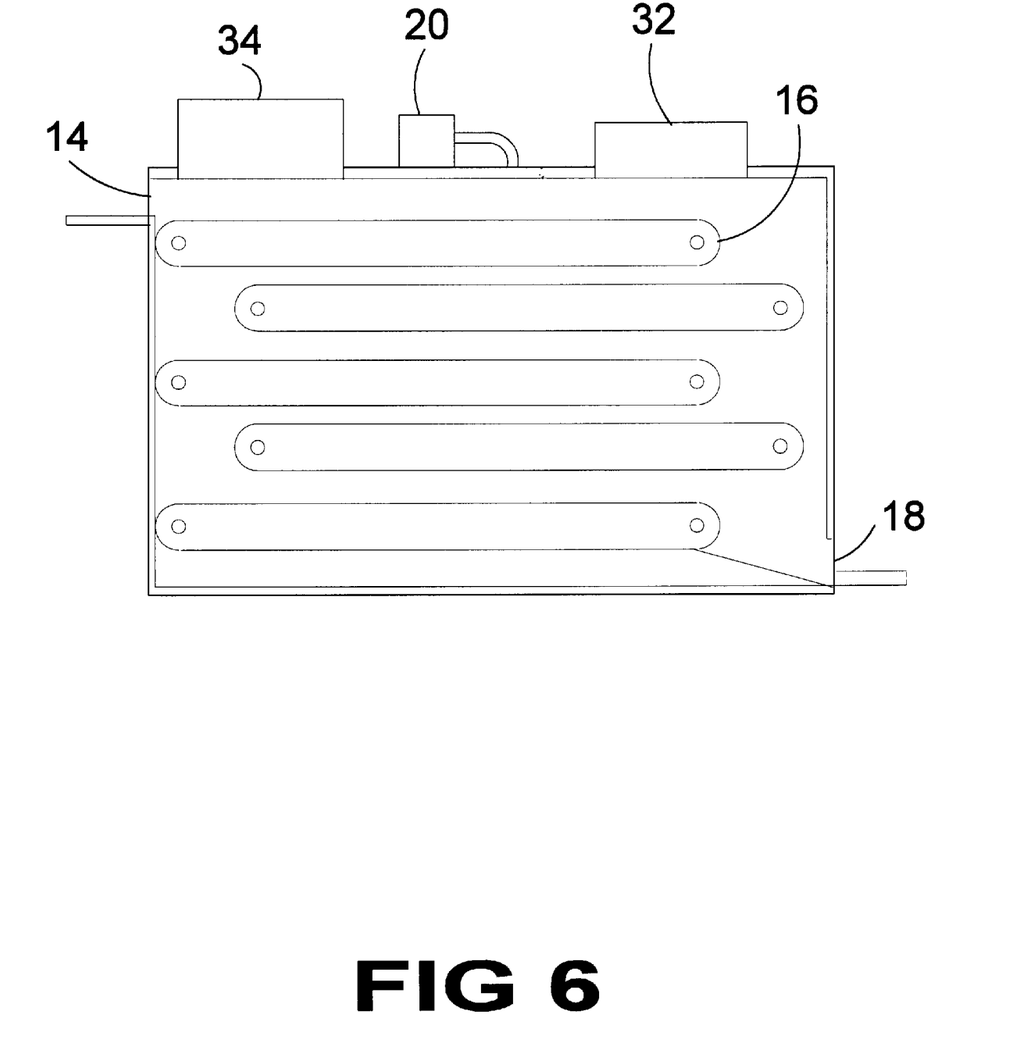
FIG. 6 is an illustration of the drying system of the present invention using a stacked horizontal conveyance system.

Turning to FIG. 6, therein is shown an illustration of the drying system of the present invention 10 using a stacked horizontal conveyance system 16. Also shown is the input port 14, the outlet 18, the vacuum 20, the blower 32 and the heater 34.

Figure 7:
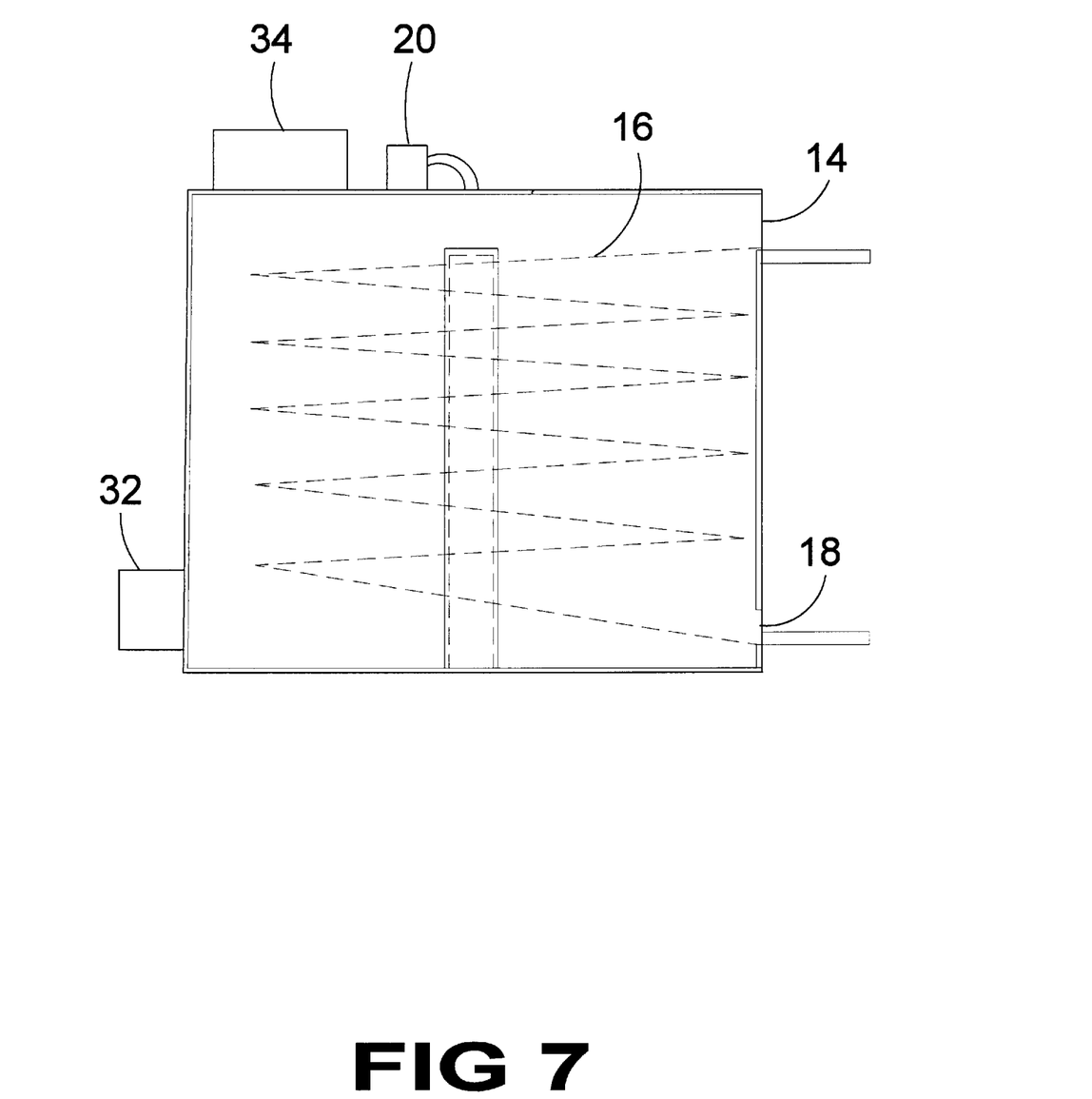
FIG. 7 is an illustration of the drying system of the present invention using a continuous drying ascending conveyance system.

Turning to FIG. 7, therein is shown an illustration of the drying system of the present invention 10 using a continuous drying ascending conveyance system 16. Also shown is the input port 14, the outlet 18, the vacuum 20, the blower 32 and the heater 34.

What is claimed to be new and desired to be protected by letters patent is set forth in the appended claims:

I claim:

1. A method for drying cooked seafood, comprising the steps of:
   a) selecting seafood for drying;
   b) inserting seafood into a dryer;
   c) spreading seafood over conveyor surface;
   d) activating the dryer;
   e) blowing hot air into the dryer;
   f) conveying seafood through the dryer using a conveyor system;
   g) blowing hot air over the seafood;
   h) having seafood reach an apex of the conveyor system and dropping into screened chute;
   i) removing by vacuum some seafood to peeling device where shells are removed and stored for disposal;
   j) returning remainder of seafood a beginning part of said conveyor system; and,
   k) repeating above steps until all seafood has been removed from the dryer to the peeling device where the shells are removed for disposal.

2. A method for drying cooked shrimp, comprising the steps of:
   a) selecting shrimp for drying;
   b) inserting shrimp into a dryer;
   c) spreading shrimp over a conveyor surface;
   d) activating the dryer;
   e) blowing hot air into the dryer;
   f) conveying shrimp through the dryer;
   g) blowing hot air over the shrimp;
   h) having shrimp reach an end of a conveyor belt in a conveyor system and dropping to a next conveyance level;
   i) removing by vacuum some shrimp to a peeling device where shells are removed and stored for disposal;
   j) conveying remainder of shrimp to end of the conveyor belt if lowest level shrimp are dumped into a hopper;
   k) removing shrimp by mechanical or manual means and returning shrimp to a beginning level of conveyance; and,
   l) repeating above steps until all the shrimp has been removed from the dryer to the peeling device where shells are removed for disposal.

3. The method of claim 1, further comprising the step of providing a peeler having an inner container and an outer container wherein said seafood is deposited by vacuum means into said inner container wherein said seafood is turned by a rotating blade which loosens the shells from said seafood.

4. The method of claim 2, further comprising the step of providing a peeler having an inner container and an outer container wherein said shrimp is deposited by vacuum means into said inner container wherein said shrimp is turned by a rotating blade which loosens the shells from said seafood.

5. The method of claim 1, further comprising the step of providing a peeler wherein said peeler is a conventional tumbler peeler.

6. The method claim 2, further comprising the step of providing a peeler wherein said peeler is a conventional tumbler peeler.

7. The method of claim 1, further comprising the step of providing an ascending conveyance system.

8. The method of claim 2, further comprising the step of providing a stacked horizontal conveyance system.

9. The method of claim 1, further comprising the step of providing a conveyor made of mesh material.

10. The method of claim 2, further comprising the step of providing a conveyor belt made of mesh material.

11. The method of claim 1, further comprising the step wherein the source of heat for said hot air is a commercial heater.

12. The method of claim 2, further comprising the step wherein the source of heat for said hot air is a commercial heater.

13. The method of claim 1, further comprising the step wherein the source of heat for said hot air is a boiler system.

14. The method of claim 2, further comprising the step wherein the source of heat for said hot air is a boiler system.

* * * * *